(12) United States Patent
Kimura

(10) Patent No.: US 7,314,193 B1
(45) Date of Patent: Jan. 1, 2008

(54) SPOOL

(76) Inventor: Fujita Kimura, 1-104, 2-1 Izumidai 7-chome, Kita-ku, Kobe-shi, Hyogo-ken (JP) 651-1141

( * ) Notice: Subject to any disclaimer, the term of this patent is extended or adjusted under 35 U.S.C. 154(b) by 0 days.

(21) Appl. No.: 11/501,146

(22) Filed: Aug. 7, 2006

(51) Int. Cl.
*A01K 89/01* (2006.01)

(52) U.S. Cl. ............... 242/322; 242/530.2; 242/530.3; 242/317

(58) Field of Classification Search ........ 242/322, 242/317, 530, 530.1, 530.2, 530.3
See application file for complete search history.

(56) References Cited

U.S. PATENT DOCUMENTS

| | | | |
|---|---|---|---|
| 3,011,735 A | 12/1961 | Lachat | |
| 6,851,637 B2 * | 2/2005 | Gilmore | 242/318 |
| 2005/0001085 A1 | 1/2005 | Kimura | |

FOREIGN PATENT DOCUMENTS

| | | |
|---|---|---|
| JP | 11220990 | 8/1999 |
| JP | 2000037155 | 2/2000 |
| JP | 2000157134 | 6/2000 |
| JP | 2002101798 | 4/2002 |
| JP | 2002153190 A | 5/2002 |
| JP | 2005218334 A | 8/2005 |
| JP | 2005304358 | 11/2005 |

* cited by examiner

*Primary Examiner*—Emmanuel M Marcelo
(74) *Attorney, Agent, or Firm*—Duane Morris LLP

(57) ABSTRACT

A spool includes a spindle (8a) perpendicularly extending from a major surface (4a) of a base plate (4). A bobbin (16a) is fitted over the spindle (8a). The bobbin (16a) includes a short cylindrical member (18a) and a flange (20a) contacting the major surface (4a) of the base plate (4). A coil of fishing line (22a) is fitted over the bobbin (16a). A short cylindrical member (10a) of a flange member is fitted into the spindle (8a). A flange (12a) is formed along the peripheral edge of the cylindrical member (10a).

7 Claims, 3 Drawing Sheets

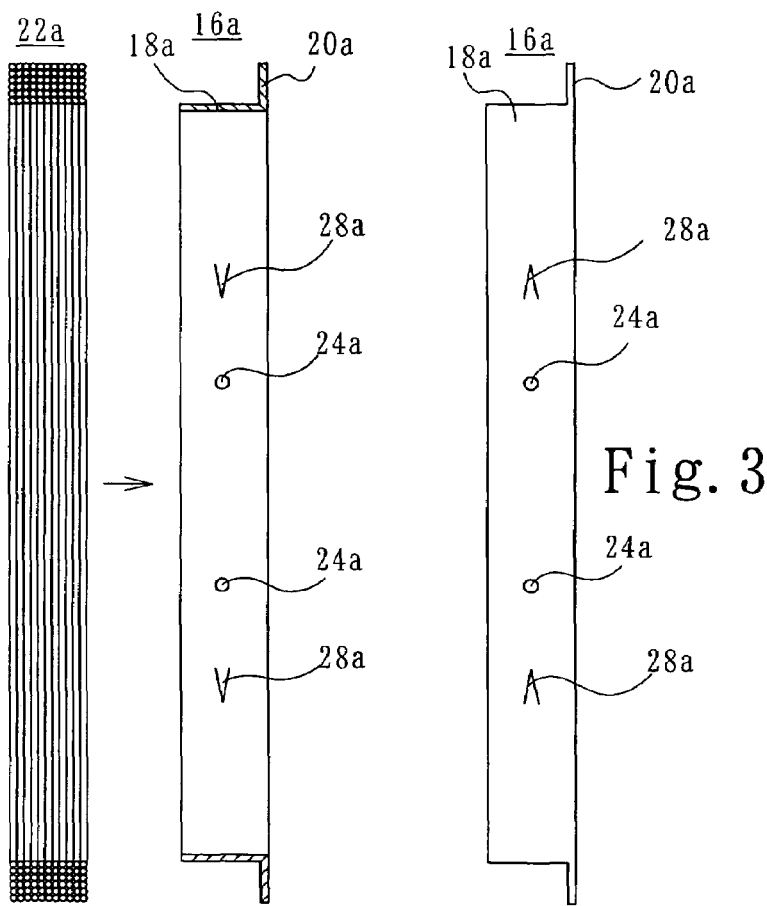
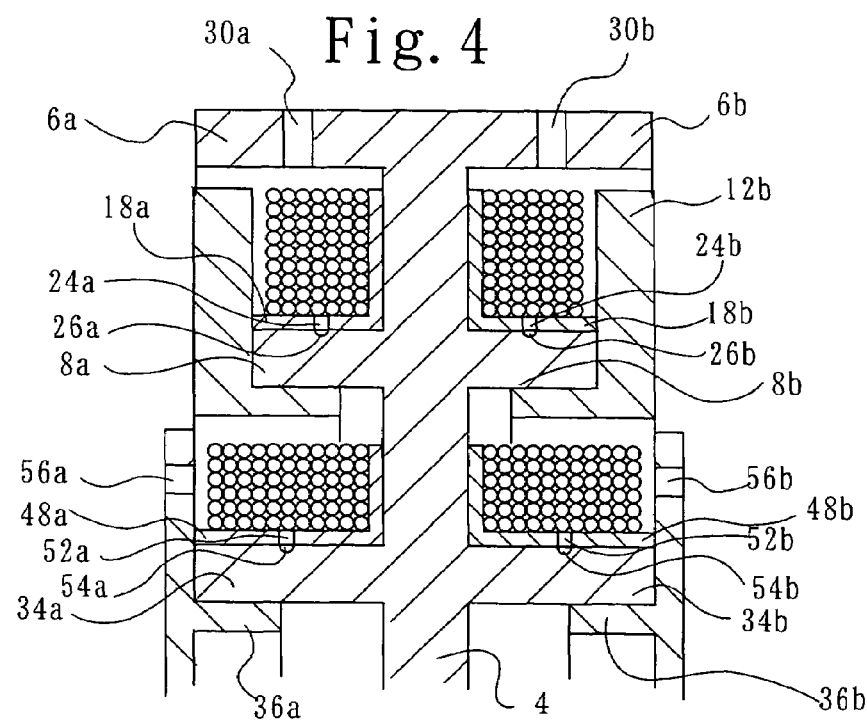

SPOOL

The present invention relates to a spool around which a fishing line, including a leader can be wound.

BACKGROUND OF THE INVENTION

A fishing line is frequently sold together with a plastic spool around which the line is wound. JP-A-2002-153190 discloses a spool assembly including a plurality of such spools successively joined together by their center spindles with fishing lines wound therearound.

When a fishing line wound around a spool is used out, the spool is usually discarded, since it is troublesome to wind a new line around it for re-use of the spool. In these days, fishing lines wound into a coil without using a spool are sold. One may consider using such a fishing line coil by mounting it on an empty spool. In this specification, a term "a coil of fishing line" or "fishing line coil" means a fishing line wound into a series of loops without using a spool.

An object of the invention is to provide a spool which can be loaded with a coil of fishing line or fishing line coil with ease.

SUMMARY OF THE INVENTION

A spool according to the present invention has a base plate having two opposing major surfaces. A first cylindrical spindle extends from one of the major surfaces of the base plate generally perpendicularly to that major surface. A first bobbin is mounted on the first spindle. The first bobbin is adapted to be loaded with a first fishing line coil. The first bobbin includes a first cylindrical member rotatably fitted over the outer peripheral surface of the first spindle, and a first flange at the proximal end, or the base plate side end, of the first cylindrical member. A first flange member is mounted to the first spindle. The first flange member has a second cylindrical member, which is removably inserted into the first spindle from the distal end of the first spindle. A second flange is formed integral with the portion of the second cylindrical member remote from the base plate. The outer periphery of the second flange is located substantially flush with the outer periphery of the base plate.

The first cylindrical member may be provided with a first line retainer for retaining the starting end of turn of the fishing line coil. The first line retainer may be a first through-hole in the first cylindrical member through which the starting end of turn of the fishing line coil is inserted. The first through-hole is smaller than a knot, which is later formed in the starting end portion of the fishing line coil. A groove in which the knot in the starting end portion of the line can be moved is formed in the outer peripheral surface of the first spindle.

A second cylindrical spindle concentric with the first spindle may be disposed inward of the first spindle. A second bobbin is mounted on the second spindle. The second bobbin is adapted to be loaded with a second fishing line coil. The second bobbin has a third cylindrical member rotatably fitted over the outer peripheral surface of the second spindle, and a third flange at the proximal end, or the base plate side end, of the third cylindrical member. A second flange member is mounted to the second spindle. The second flange member has a fourth cylindrical member, which is removably inserted or fitted into the second spindle from the distal end of the second spindle. A fourth flange is formed integral with the distal peripheral edge of the fourth cylindrical member remote from the base plate. The outer periphery of the fourth flange is located substantially flush with the first spindle.

The third cylindrical member may be provided with a second line retainer for retaining the starting end of turn of the second fishing line coil. The second line retainer may be a second through-hole in the third cylindrical member into which the starting end of turn of the second fishing line coil is inserted. The second through-hole is smaller than a knot formed in the starting end of turn of the second fishing line coil. A groove in which the knot in the starting end of the line can be moved is formed in the outer peripheral surface of the second spindle.

BRIEF DESCRIPTION OF THE DRAWINGS

FIG. 2 illustrates how a bobbin of the spool of FIG. 1 is loaded with a fishing line coil.

FIG. 3 is a side view of the bobbin of the spool of FIG. 1.

FIG. 4 is a cross-sectional view of a portion of the spool of FIG. 1 loaded with fishing line coils.

BEST MODE TO CARRY OUT THE INVENTION

Figure 1:
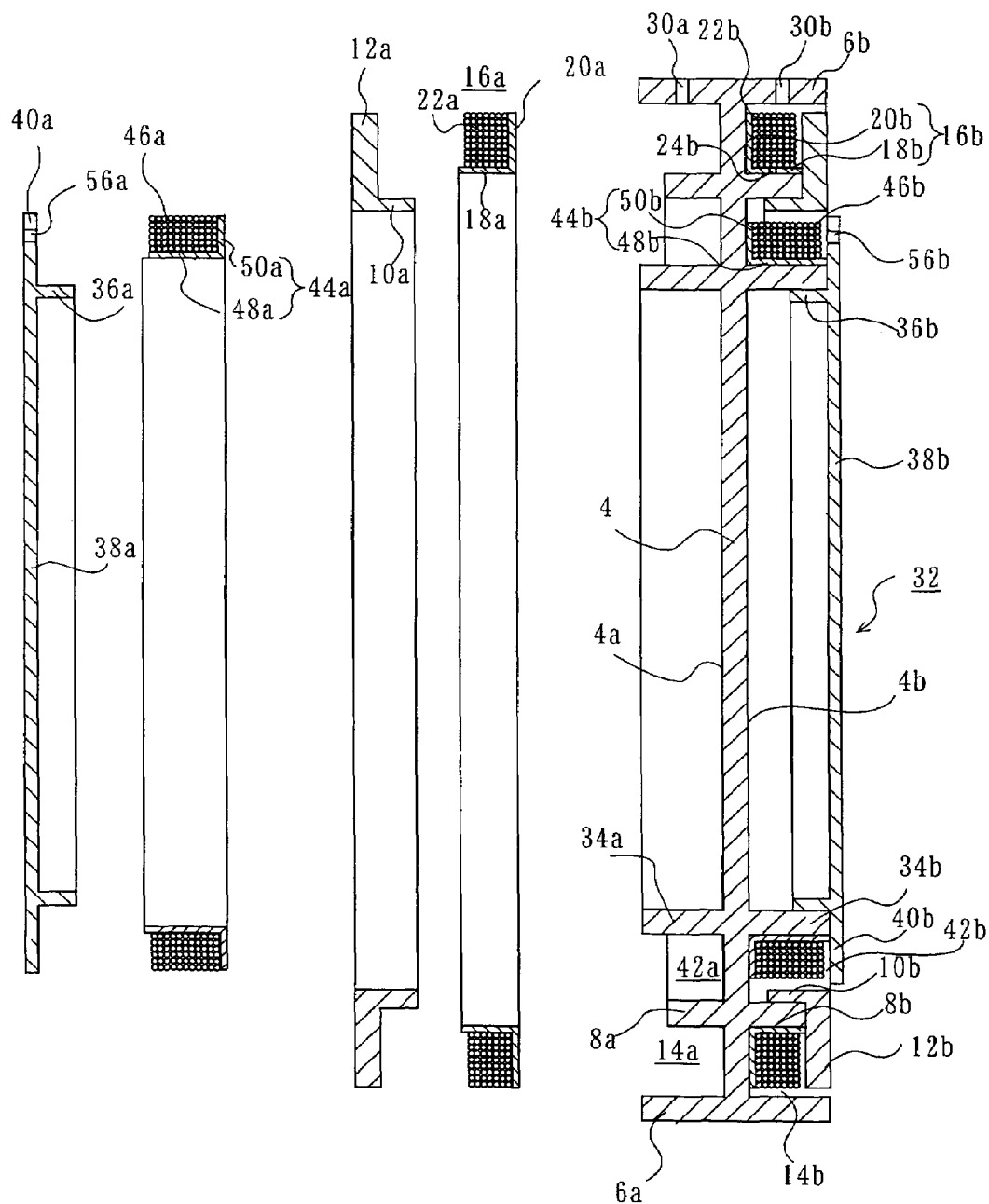
FIG. 1 is an exploded, cross-sectional view of a spool according to a first embodiment of the present invention.

As shown in FIG. 1, a spool according to a first embodiment of the present invention includes a larger spool unit 2. The larger spool unit 2 includes a base plate 4, which may be in the form of a circular disc. The base plate 4 has opposing major surfaces 4a and 4b. From the outer periphery of the base plate 4, short cylindrical members 6a and 6b, which are concentric with the base plate 4, extend in opposite directions perpendicular to the respective major surfaces 4a and 4b for the same distance. In place of the short cylindrical members 6a and 6b, short hollow prismatic members having a polygonal profile may be used. The outer diameter and inner diameter of the short cylindrical member 6a are equal to those of the cylindrical member 6b, respectively.

A first spindle, which may be, for example, short cylindrical members 8a and 8b, extends in opposite directions perpendicular to the major surfaces 4a and 4b of the base plate 4 for the same distance. The short cylindrical members 8a and 8b are concentric with and radially inward of the short cylindrical members 6a and 6b. The distal edges of the cylindrical members 8a and 8b, which edges are remote from the base plate 4, are located closer to the base plate 4 than those of the short cylindrical members 6a and 6b. The outer diameter and inner diameter of the cylindrical member 8a are equal to those of the cylindrical member 8b, respectively.

Cylindrical members 10a and 10b are inserted into openings formed by the peripheries of the distal edges of the cylindrical members 8a and 8b. The cylindrical members 10a and 10b have outer diameters equal to the inner diameters of the cylindrical members 8a and 8b, respectively. The outer peripheral surfaces of the cylindrical members 10a and 10b are friction-engaged with the inner peripheral surfaces of the cylindrical members 8a and 8b, respectively, so that the cylindrical members 10a and 10b are detachable with respect to the cylindrical members 8a and 8b, respectively.

Loop-shaped, e.g. ring-shaped, second flanges 12a and 12b are formed integral with the distal edges of the cylindrical members 10a and 10b, respectively. When the cylindrical members 10a and 10b are in friction-engagement with the cylindrical members 8a and 8b, respectively, the peripheries of the flanges 12a and 12b are located near the cylindrical members 6a and 6b, respectively. The cylindrical members 10a and 10b and the flanges 12a and 12b form two first flange members. With these flange members engaging with the cylindrical members 6a and 6b, respectively, the inner surface of the flange 12a, the outer peripheral surface of the cylindrical member 8a and the major surface 4a of the base plate 4 form a groove 14a. Similarly, the inner surface of the flange 12b, the outer peripheral surface of the cylindrical member 8b and the major surface 4b of the base plate 4 form a groove 14b.

Bobbins 16a and 16b are fitted into the grooves 14a and 14b, respectively. The bobbins 16a and 16b may be formed of, for example, paper, and include first cylindrical members, e.g. short cylindrical members 18a and 18b, respectively. The cylindrical members 18a and 18b are rotatably fitted over the outer peripheral surfaces of the cylindrical members 8a and 8b, respectively. First flanges 20a and 20b extend from the inner edges, which are closer to the base plate surfaces 4a and 4b, of the cylindrical members 18a and 18b, respectively, to radially outward points near the inner peripheral surfaces of the cylindrical members 6a and 6b, respectively.

A fishing line coil 22a formed of a series of turns of a fishing line is inserted in a direction indicated by an arrow in FIG. 2 to fit over the cylindrical member 18a of the bobbin 16a. Similarly, although not shown in FIG. 2, a fishing line coil 22b formed of a series of turns of a fishing line is fitted over the cylindrical member 18b of the bobbin 16b.

A plurality of line end retainers, e.g. through-holes 24a, are formed through the peripheral surface of the cylindrical member 18a at circumferentially spaced locations, as shown in FIGS. 2 and 3. Similarly, a plurality of through-holes 24b (FIG. 1) are formed through the peripheral surface of the cylindrical member 18b at circumferentially spaced locations, although only one hole 24b is shown in FIG. 1. The innermost end, i.e. starting end of turn, of the fishing line of the coil 22a is inserted into any one of the through-holes 24a from the outer surface, and a knot is formed in the innermost end after the fishing line is inserted through that through-hole 24a. The through-holes 24a are of such a size that the knot cannot slip off through them. Similarly, the innermost end of the fishing line of the coil 22b is inserted into any one of the through-holes 24b from the outer surface, and a knot is formed in the innermost end after the fishing line is inserted through that through-hole 24b. The through-holes 24b, too, are of such a size that the knot cannot slip through them. In order to prevent the knots from obstructing the rotation of the cylindrical members 18a and 18b around the cylindrical members 8a and 8b, grooves 26a and 26b are formed in the outer peripheral surfaces of the cylindrical members 8a and 8b, respectively, as shown in FIG. 4, so that the knots can enter into and move in the respective grooves 26a and 26b.

Also, chevron-shaped cuts 28a are formed, as the line end retainers, in the cylindrical member 18a at circumferentially spaced locations, as shown in FIGS. 2 and 3. Although not shown, similar chevron-shaped cuts are formed in the cylindrical member 18b, too. The innermost end of each of the fishing line coils 22a and 22b is put to engage with one of the chevron-shaped cuts for retention. Which retainers, the through-holes or the chevron-shaped cuts, are used depends on a user's preference. Further, through-holes 30a and 30b are formed in the cylindrical members 6a and 6b through which the outermost ends, i.e. the finishing end of turn, of the fishing line coils 22a and 22b are pulled out.

For loading the larger spool unit 2 with the fishing line coils 22a and 22b, first the flange members 12a and 12b are removed from the cylindrical members 8a and 8b, respectively, and, then, the bobbins 16a and 16b are removed. The fishing line coils 22a and 22b are fitted over the bobbins 16a and 16b, and, after causing the innermost ends of the respective fishing line coils 22a and 22b to be retained by the retainers, the bobbins 16a and 16b are mounted on the cylindrical members 8a and 8b, respectively. Thereafter, the outermost ends of the respective fishing line coils 22a and 22b are pulled out through the holes 30a and 30b. After that, the flange members 12a and 12b are fitted into the cylindrical members 8a and 8b, respectively. As the outermost ends of either or both of the fishing line coils 22a and 22b are pulled, the fishing line coils 22a and/or 22b and the associated bobbins 16a and/or 16 are rotated about the cylindrical members 8a ad/or 8b since the innermost ends of the fishing line coils 22a and 22b are coupled to the bobbins 16a and 16b by the retainers. In this manner, the fishing lines can be unwound from the coils on the spool with ease. Accordingly, if the diameters of the fishing line coils 22a and 22b are larger than the outer diameters of the cylindrical members 18a and 18b, different from the ones shown in FIGS. 1 and 2, the fishing lines can be easily pulled out from the spool.

One may consider using, in place of the bobbins 16a and 16b, bobbins similar to the bobbins 16a and 16b, but having additional flanges on the cylindrical members 18a and 18b facing to the flanges 20a and 20b, respectively. However, it is very troublesome to put a fishing line coil on such a bobbin having flanges on both sides, and, accordingly, anglers may use a bobbin with flanges on its both sides between which a fishing line is wound, and, when the line is used out, a new bobbin with a fishing line which has been wound around it is used. On the other hand, each of the bobbins 16a and 16b has the flange 20a or 20b formed on its base plate side, only, and, therefore, it is easy to load the bobbin 16a or 16b with a coil of fishing line 22a or 22b. Thus, a coil of fishing line without a bobbin can be used, so that the bobbins 16a and 16b can be used repeatedly.

The spool according to the first embodiment includes also a smaller spool unit 32. The smaller spool unit 32 has a second spindle formed of, for example, short cylindrical members 34a and 34b. The cylindrical members 34a and 34b extend from the major surfaces 4a and 4b of the base plate 4 perpendicularly in opposite directions. The cylindrical members 34a and 34b extend from locations on the base plate 4 radially inward of the cylindrical members 8a and 8b, and are concentric with and in parallel with the cylindrical members 8a and 8b.

Third short cylindrical members 36a and 36b are fitted into the distal end openings of the respective cylindrical members 34a and 34b. The outer diameters of the cylindrical members 36a and 36b are equal to the inner diameters of the cylindrical members 34a and 34b, respectively. The outer surfaces of the cylindrical members 36a and 36b are friction-engaged with the inner peripheral surfaces of the cylindrical members 34a and 34b, respectively. Thus, the cylindrical members 36a and 36b are detachable with respect to the cylindrical members 34a and 34b, respectively.

Distal end openings of the cylindrical members 36a and 36b, i.e. openings on the side remote from the base plate 4, are closed by plates, e.g. disc-shaped plates 38a and 38b, respectively, and loop-shaped flanges 40a and 40b, which may be ring-shaped, are formed around the distal end openings. The cylindrical members 36a and 36b, the disc-shaped plates 38a and 38b, and the ring-shaped flanges 40a and 40b provide two second flange members.

With the cylindrical members 36a and 36b friction-engaged with the cylindrical members 34a and 34b, the outer peripheral edges of the flanges 40a and 40b are at a location more or less radially inward of the inner peripheral surfaces of the cylindrical members 10a and 10b, respectively, and the flange 40a, the outer peripheral surface of the cylindrical member 34a, and the major surface 4a of the base plate 4 form a groove 42a, while the flange 40b, the outer peripheral surface of the cylindrical member 34b, and the major surface 4b of the base plate 4 form a groove 42b.

Bobbins 44a and 44b with coils 46a and 46b of fishing lines, e.g. leaders, are fitted into the grooves 42a and 42b, respectively. Similar to the bobbins 16a and 16b, the bobbin 44a includes a short cylindrical member 48a and a flange 50a, and the bobbin 44b includes a short cylindrical member 48b and a flange 50b. The bobbin 44a has a through-holes 52a similar to the through-holes 24a, and cuts (not shown) similar to the cuts 28a, and the bobbin 44b has through-holes 52b similar to the through-holes 24b, and cuts (not shown) similar to the cuts 28b. Also grooves 54a and 54b similar to the grooves 26a and 26b are formed in the cylindrical members 34a and 34b, respectively. Like the larger spool unit 2, the smaller spool unit 32 is also loaded with coils of fishing lines 46a and 46b. Through-holes 56a and 56b are formed in the flanges 40a and 40b, respectively, through which the fishing lines 46a and 46b are led out.

Figure 5:
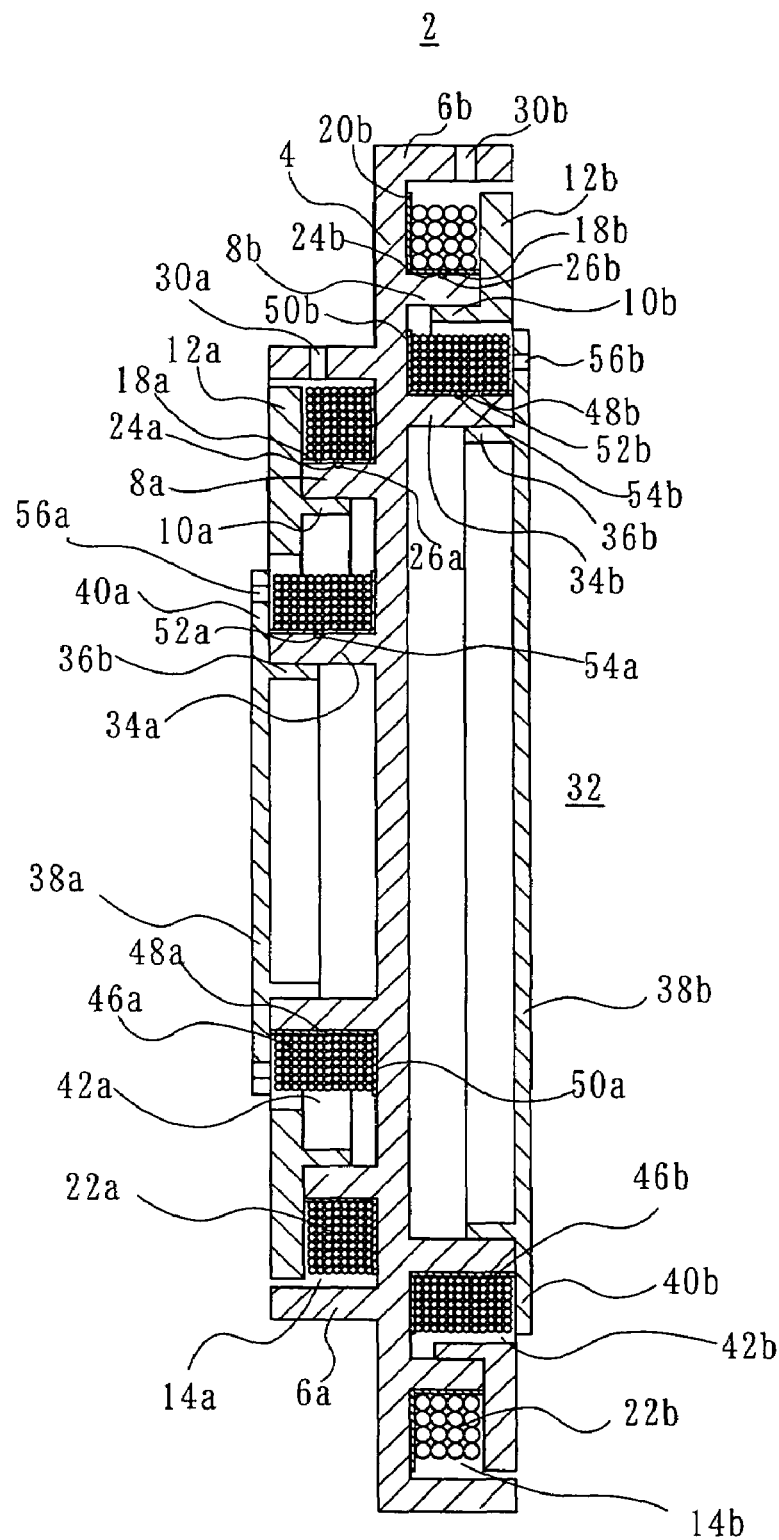
FIG. 5 is a cross-sectional view of a spool according to a second embodiment of the invention.

According to the first embodiment, the outer diameters of the cylindrical members 8a and 8b of the larger spool unit 2 are equal so that the diameters of the grooves 14a and 14b as measured at their bottoms are also equal. However, the outer diameters of the cylindrical members 8a and 8b may be different as shown in FIG. 5, which illustrates a spool according to a second embodiment of the present invention, so that the diameters of the grooves 14a and 14b as measured at the groove bottoms are different. Similarly, the cylindrical members 36a and 36b of the smaller spool unit 32 may have different outer diameters, resulting in different diameters of the grooves 42a and 42b as measured at the groove bottoms. With this arrangement of the spool according to the second embodiment, it is easy to identify types of fishing lines put in the respective grooves.

Not only a leader but also a thicker fishing line can be used with the spool according to the present invention, and a fishing line with a leader may be used, too. Further, the larger spool unit 2 has been described to include two grooves 14a and 14b, but the number of the grooves of the larger spool unit 2 is not limited to two (2), and it may be one or three or more. Also, the spool has been described as having grooves 14a and 42a and grooves 14b and 42b on the major surfaces 4a and 4b of the base plate 4, respectively, but the spool may have either the grooves 14a and 42a or the grooves 14b and 42b, only.

What is claimed is:

1. A spool comprising:
   a base plate having first and second opposing major surfaces;
   a first generally cylindrical spindle extending from said first major surface of said base plate in a direction substantially perpendicular to said first major surface;
   a first bobbin comprising a first cylindrical member rotatably fitted over said first spindle, and a first flange formed along a peripheral edge at a proximal end, near to said base plate, of said first cylindrical member, said first bobbin being so adapted that a coil of first fishing line prepared beforehand can be slid onto and fitted over said first cylindrical member; and
   a first flange member comprising a second cylindrical member detachably fitted into said first spindle from a distal end of said first spindle, said second cylindrical member having an outer peripheral surface contacting an inner peripheral surface of said first spindle, said first flange member further including a second flange formed integral with said second cylindrical member along a peripheral edge at a distal end, remote from said base plate, of said second cylindrical member, said second flange extending in parallel with said base plate and having a peripheral surface thereof being located in proximity to an outer peripheral surface of said base plate.

2. The spool according to claim 1, wherein said first cylindrical member has a first line retainer formed thereon for retention of a starting end of a turn of said coil of first fishing line.

3. The spool according to claim 2, wherein said first line retainer is a first hole through which said starting end of said turn of said coil of first fishing line is adapted to be inserted, said first hole being smaller in size than a knot to be formed at said starting end of said first fishing line coil; and said first spindle further includes a groove formed in an outer peripheral surface thereof such that said knot can move in said groove.

4. The spool according to claim 1 further comprising:
   a second generally cylindrical spindle extending from said first major surface in a direction substantially perpendicular to said first major surface, said second spindle being located radially inward of and concentric with said first spindle;
   a second bobbin comprising a third cylindrical member rotatably fitted over said second spindle, and a third flange formed along a peripheral edge at a proximal end, near to said base plate, of said third cylindrical member, a coil of second fishing line being adapted to be fitted over said second bobbin; and
   a second flange member comprising a fourth cylindrical member detachably fitted into said second spindle from a distal end of said second spindle, said fourth cylindrical member having an outer peripheral surface contacting an inner peripheral surface of said second spindle, said second flange member further including a fourth flange formed integral with said fourth cylindrical member along a peripheral edge at a distal end, remote from said base plate, of said fourth cylindrical member, the peripheral surface of said fourth flange being generally flush with said first spindle.

5. The spool according to claim 4, wherein said third cylindrical member has a second line retainer formed thereon for retention of a starting end of a turn of said coil of second fishing line.

6. The spool according to claim 5, wherein said second line retainer is a second hole through which said starting end of said turn of said coil of second fishing line is adapted to be inserted, said second hole being smaller in size than a knot to be formed at said starting end of said second fishing line coil; and said second spindle further includes a groove formed in an outer peripheral surface thereof such that said knot in said second fishing line can move in said groove.

7. A spool comprising:
   a base plate having opposing two major surfaces;
   a spindle extending generally perpendicularly from one of said major surfaces of said base plate;
   a bobbin rotatably fitted over said spindle, a line being adapted to be wound around said bobbin;
   a cylinder extending generally perpendicularly from said one major surface of said base plate in such a manner as to surround said bobbin; and
   a bobbin retainer including an annular cover extending between the vicinity of a distal end of said cylinder and the vicinity of a distal end of said spindle to thereby prevent said bobbin from slipping off from said spindle.

* * * * *